UNITED STATES PATENT OFFICE.

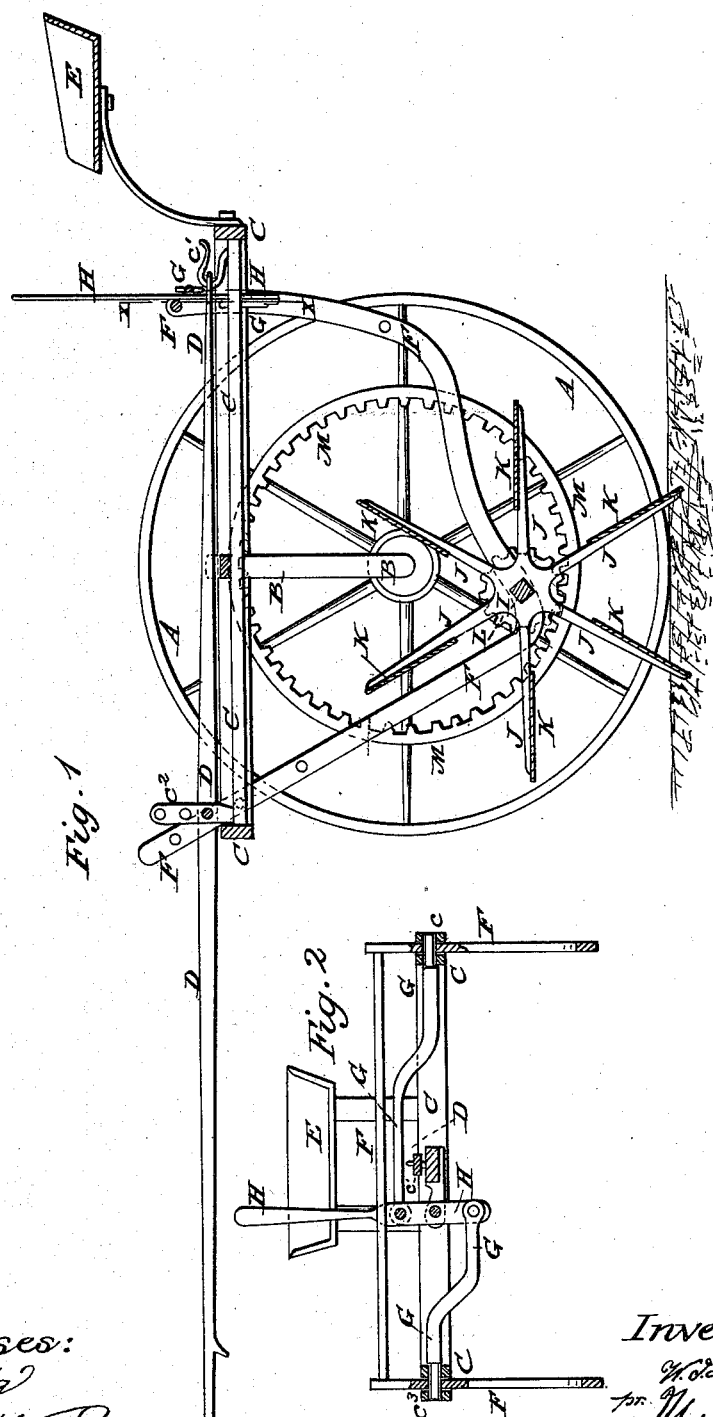

WILLIAM J. DAWSON, OF BROOKFIELD, MISSOURI.

IMPROVEMENT IN REVOLVING PLOWS.

Specification forming part of Letters Patent No. 95,005, dated September 21, 1869.

*To all whom it may concern:*

Be it known that I, WILLIAM J. DAWSON, of Brookfield, in the county of Linn and State of Missouri, have invented a new and Improved Revolving Plow; and I do hereby declare that the following is a full, clear, and exact description thereof, which will enable others skilled in the art to make and use the same, reference being had to the accompanying drawings, forming part of this specification.

Figure 1 is a vertical longitudinal section of my improved revolving plow. Fig. 2 is a detail section of the same, taken through the line $x\ x$, Fig. 1.

Similar letters of reference indicate corresponding parts.

My invention has for its object to furnish a simple, convenient, and effective machine, by means of which cultivated land may be prepared for the reception of the seed thoroughly and well, and which may be operated with a comparatively light draft; and it consists in the construction and combination of various parts of the machine, as hereinafter more fully described.

A are the wheels, which are placed and work upon the journals of the axle B in the ordinary manner. The axle B, near each end, is bent twice at right angles, so that its middle part may be raised considerably above the line of its journals.

To the middle or upper part of the axle B is rigidly and securely attached a horizontal frame, C.

D is the tongue, the rear end of which hooks upon a hook, $c'$, attached to the rear part of the frame C, or is otherwise detachably pivoted to the said part of the said frame. The tongue D passes through the slot of the slotted standard $c^2$, attached to the forward part of the frame C, in which standard it is adjustably secured in place by a pin passing through a hole in the said tongue, and through one or the other of the holes through the said slotted standard, so that the tongue may be raised or lowered, according to the amount of downward pressure required to be applied to the plow.

E is the driver's seat, which is attached to the middle part of the rear side of the frame C.

F is a frame, the side bars of which are curved into about the shape shown in Fig. 1, and the forward ends of which are adjustably pivoted to the forward part of the side bars of the frame C by bolts or rivets. The rear parts of the side bars of the frame F pass up through keepers $c^3$, attached to or through slots formed in the rear parts of the side bars of the frame C, where they are adjustably secured in place by bolts G, passing through the side bars of the frame C and one or the other of the holes in the side bars of the frame F. The bolts G are made long, and their inner ends are pivoted to the lever H, the one above and the other below the pivoting-point of said lever, and equally distant from said pivoting-point. The lever H is pivoted to a support attached to the central longitudinal bar of the frame C, and its upper end extends up into such a position that it may be conveniently reached and operated by the driver from his seat. The rear ends of the side bars of the frame F are connected by a cross-bar, so that the said side bars may move together, and which at the same time serves as a handle for raising and lowering the said frame F.

In the lower part of the side bars of the frame F are formed bearings for the shaft I, to which shaft are attached the inner ends of the arms J, to the outer ends of which are attached the knife or shovel-plates K, as shown in Fig. 1, so that when the machine is drawn forward the said knife or shovel-plates may enter the soil, turn it over, stir it up, and thoroughly mix it.

To one end of the shaft I is attached a small gear-wheel, L, the teeth of which, when the frame F is lowered, mesh into the teeth of the internally-toothed gear-wheel M, attached to or formed upon one of the wheels A, said wheels M and L being so constructed and arranged as to give the proper motion to the plow I J K as the machine is drawn forward.

By this construction and arrangement the machine may be easily adjusted by means of the lever H and bolts G to stir or plow the ground to any desired depth, or raised clear of the ground for convenience in passing from place to place.

Having thus described my invention, I claim as new and desire to secure by Letters Patent—

1. An improved revolving plow, formed by the combination of the plow or shovel-plates K, arms J, shaft I, pivoted adjustable frame F, horizontal frame C, axle B, gear-wheels L M, and wheels A, with each other, and arranged to operate as herein shown and described, and for the purpose set forth.

2. The combination of the long bolts G and pivoted lever H with the adjustable frame F and stationary frame C, substantially as herein shown and described, and for the purpose set forth.

WM. J. DAWSON.

Witnesses:
GEO. W. MARTIN,
W. C. NEEDLES.